United States Patent [19]

Carrow et al.

[11] 4,299,575
[45] Nov. 10, 1981

[54] RUNNING LIGHTS SIMULATOR

[75] Inventors: William W. Carrow, Springfield; Joseph R. Moulton, Fredericksburg, both of Va.

[73] Assignee: The United States of America as represented by the Secretary of the Army, Washington, D.C.

[21] Appl. No.: 157,575

[22] Filed: Jun. 9, 1980

[51] Int. Cl.³ .......................... F41F 3/26; B60Q 1/26
[52] U.S. Cl. ........................................ 434/11; 362/61
[58] Field of Search ............................ 434/11; 362/61; 273/359, 365

[56] References Cited

U.S. PATENT DOCUMENTS

| | | | |
|---|---|---|---|
| 3,112,888 | 12/1963 | McKenzie | 362/61 |
| 3,885,146 | 5/1975 | Whitley, Jr. | 362/61 |
| 4,106,081 | 8/1978 | Turturici | 362/61 |
| 4,126,312 | 11/1978 | Kreuzer et al. | 434/11X |
| 4,226,292 | 10/1980 | Monte et al. | 434/11 X |
| 4,240,212 | 12/1980 | Marshall et al. | 434/11 |

Primary Examiner—William H. Grieb
Attorney, Agent, or Firm—Nathan Edelberg; Milton W. Lee; Max L. Harwell

[57] ABSTRACT

A means for training troops to readily identify and successfully engage enemy vehicles at night by providing a system simulating the lighting signature patterns of running lights of said enemy vehicles. The simulated running lights may be mounted on a simulated enemy vehicle in the appropriate lighting signature patterns. The simulated enemy vehicle may be a friendly tank or other vehicles, such as jeeps, armored personnel carriers, ¾-ton vehicles, etc. The simulated running lights may be attached to the friendly vehicle by field expedient tape, wire, screws, etc. and have input power passing through operator dimmer controlled organic dimmer/map light assemblies to adjust the brightness of the running lights in accordance with the brightness of the map light inside the simulated enemy vehicle.

11 Claims, 9 Drawing Figures

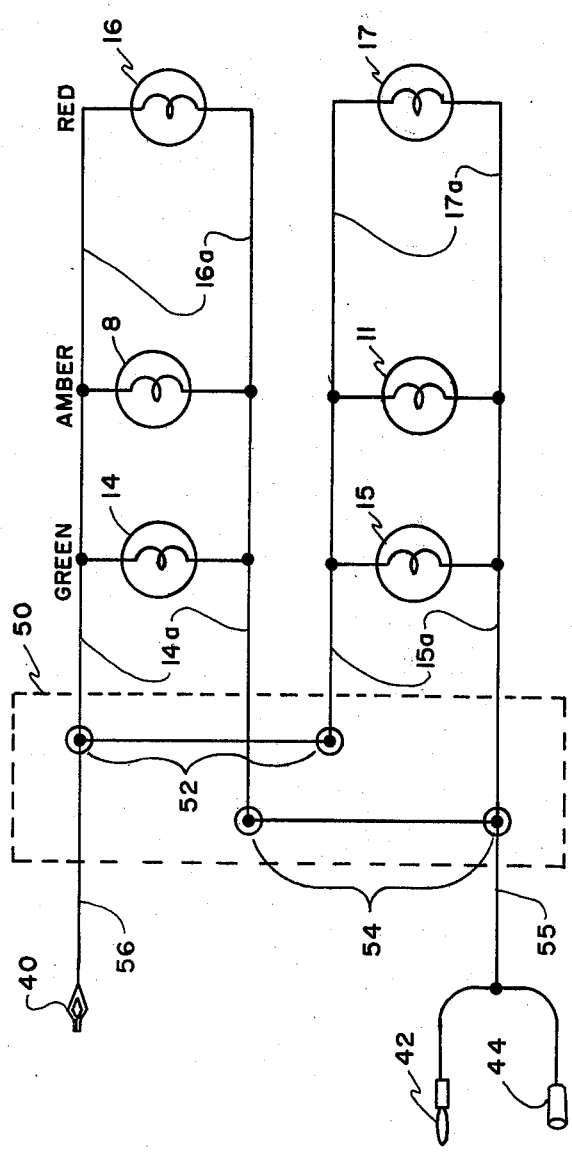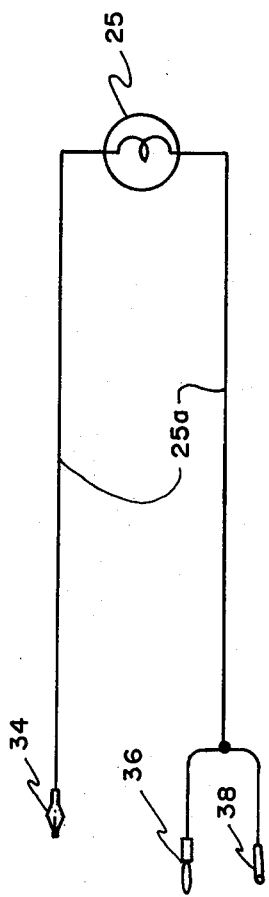
FIG. 2
FIG. 3

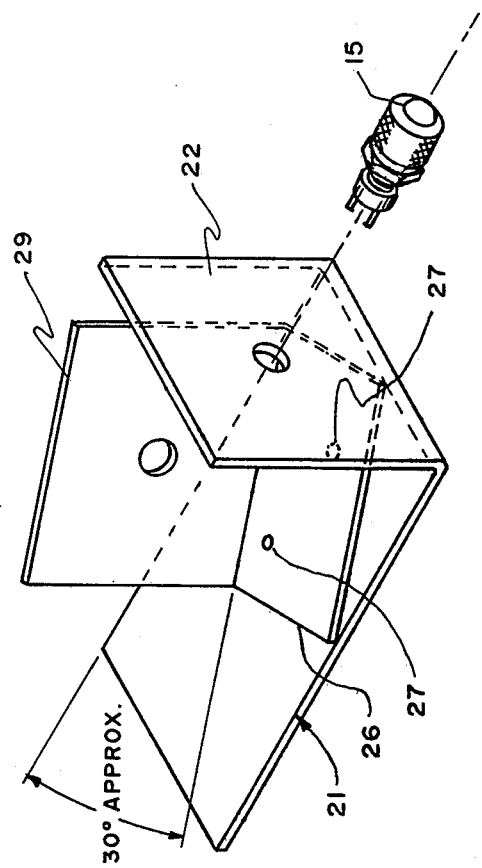
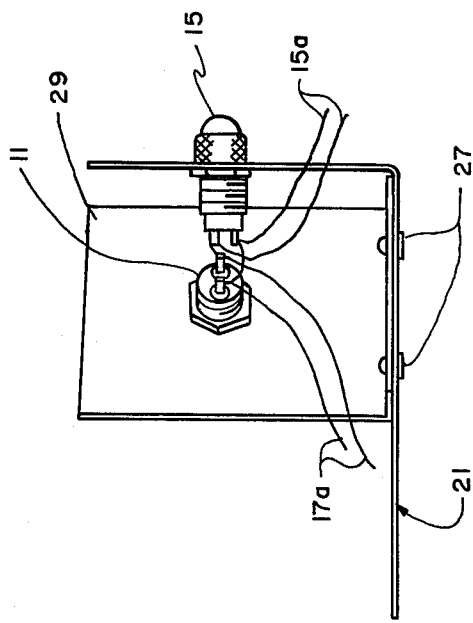
FIG. 4B
FIG. 4A

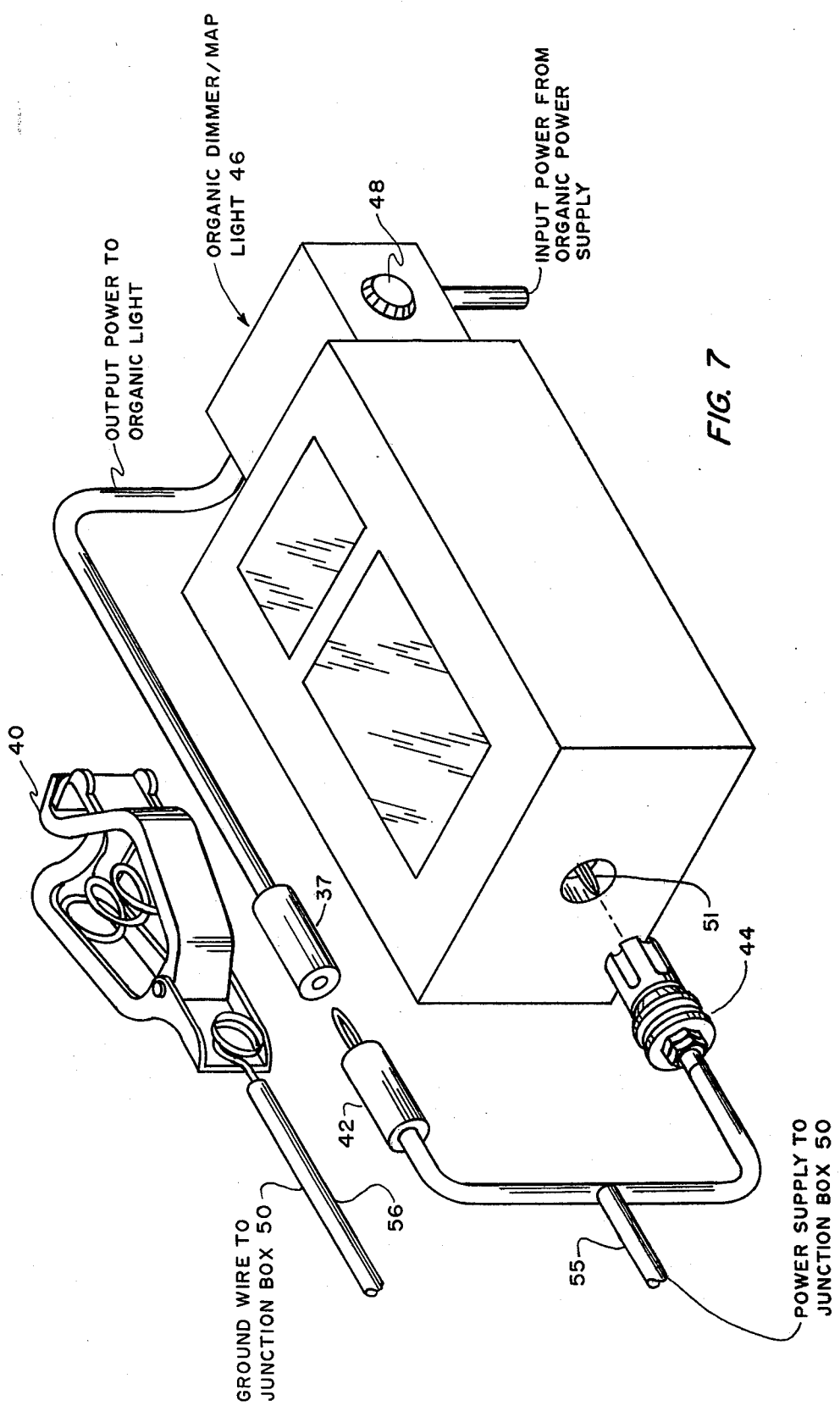

4,299,575

RUNNING LIGHTS SIMULATOR

The invention described herein may be manufactured, used, and licensed by the U.S. Government for governmental purposes without the payment of any royalties thereon.

BACKGROUND OF THE INVENTION

1. Field of the Invention

The present invention is in the field of simulating the light signature patterns of enemy vehicle running lights to such a degree of exactness that the enemy vehicle running lights simulator is used to train gunners in identifying and conducting nighttime operations against the enemy.

Current threat tactics by Warsaw Pact armor calls for extensive use of vehicle running lights when engaged in nighttime operations. During one of the recent conflicts, namely the 1967 Six-Day War in the Mideast, Israeli anti-tank troops learned to detect the direction of movement of enemy armor forces from knowledge of the enemy running lights, called "cat-eyes" because of the light pattern presented when the enemy armor was advancing. In order to conduct realistic target acquisition and surveillance training, the U.S. Army must consider the resultant lighting patterns as observed by Israel. Since the U.S. Army inventory of captured Warsaw Pact vehicles is very limited, it would be impossible to use this limited number of vehicles to provide adequate night training.

One of the purposes of this invention is to provide U.S. training units the ability to simulate enemy lighting patterns using U.S. vehicles. By using these simulated enemy vehicle running lights, infantry commanders would be able to conduct night operations training exercises to train their personnel to detect enemy targets using image intensifiers, optics, or the unaided eye.

2. Description of the Prior Art

No known means existed prior to the present system for providing an economical yet effective enemy vehicle running light simulator to provide nighttime enemy target identification by simulating the lighting signature pattern of enemy vehicles, such as the running lights of Warsaw Pact armor vehicles.

SUMMARY OF THE INVENTION

One object of the present invention is to provide an inexpensive means to train U.S. Army troops in realistic unit training to recognize Warsaw Pact threat vehicles during night training exercises and to be more effective in actual combat. The present running lighting system could also be used in actual combat to provide fixed and/or mobile mock-up vehicles that may be deployed as decoys to confuse the enemy as to the location of their own vehicles.

The present running lights simulator is easily constructed using locally available manpower and scrap or excess material, and/or materials available through the Federal Stock System. The simulator may be manufactured and assembled at the unit or higher level. Construction time per system is nominally four man hours, once the personnel gain experience. Cost is very low, estimated at less than twenty-five dollars ($25) per unit for worst case parts procurement situations. Any available salvage materials will lower that figure.

The enemy vehicle running lights simulator is fabricated by installing a readily available array of instrument panel simulator lamp assemblies, comprised of a plurality of lamps affixed to a locally manufactured or stock item brackets, mounted at appropriate locations on a simulation of a Red Team "Tank," with the Red Team "bank" being the conventional "enemy" in training exercises, and will be explained herein as the simulated enemy vehicle. The lamp assemblies are positioned on the right and left front, the right and left rear, and on the rear of the turret of the simulated enemy vehicle. Both of the front lamp assemblies have a front view and a side view lamp. The front view lamps are green, the side view lamps are amber, and the rear view lamps are red. The lamps form a portion of the lamp assemblies that are further comprised of the brackets which are mounted on the simulated enemy vehicle. The brackets are typically made of sheet material. The lamp assembly sheet metal brackets and the electrical wiring connected to the lamps are attached to the outer surface of the vehicle by the most field expedient means, such as the U.S. Army's green cloth tape, which allows for easy attachment and removal. However, other available means of attachment may be used. The lamp assemblies position the lamps in a lighting signature pattern of the running lights of an enemy vehicle, such as the Russian T62 tank.

Power to operate the lamp assemblies is preferably supplied from the organic power supply of the simulated enemy vehicle upon which the lamp assemblies are mounted. The amount of power required from the power supply is nominally 24 to 28 volts D.C. at 12 amperes. The total amount of power supplied to the lamp assemblies may be regulated, or controlled, within the simulated enemy vehicle by an operator adjusting dimmer controls, which are organic to the vehicle and are employed to power the lamp assemblies. An organic drivers dimmer/map light assembly is comprised of one dimmer control and an organic turret dimmer/map light assembly is comprised of one dimmer control. In practice, lights on these two dimmer/map light assemblies on the inside of the simulated enemy vehicle will be set to obtain the desired brightness of the simulator lamp assemblies that are on the exterior of the simulated enemy vehicle. Small pieces of tape or some partially transparent material may be placed over the map light windows of the dimmer/map assemblies when the simulator lamp assemblies are at their brightest to sufficiently dim the map lights and avoid interference with the vision of the simulated enemy vehicle driver or operator.

The present enemy vehicle running lights simulator will be better understood with reference to the following drawings and the detailed description.

BRIEF DESCRIPTION OF THE DRAWINGS

FIG. 2 is a schematic electrical wiring diagram of the running lights lamp assemblies excluding the turret lamp assembly;

FIG. 3 is a schematic electrical diagram of the turret lamp assembly;

FIGS. 4A and 4B show a flat side view and a perspective view respectively of the left front lamp assembly looking outward from the tank;

FIG. 7 illustrates an organic dimmer/map light assembly modifier to control the intensity of the lamps.

DETAILED DESCRIPTION OF THE PREFERRED EMBODIMENT

Figure 1:
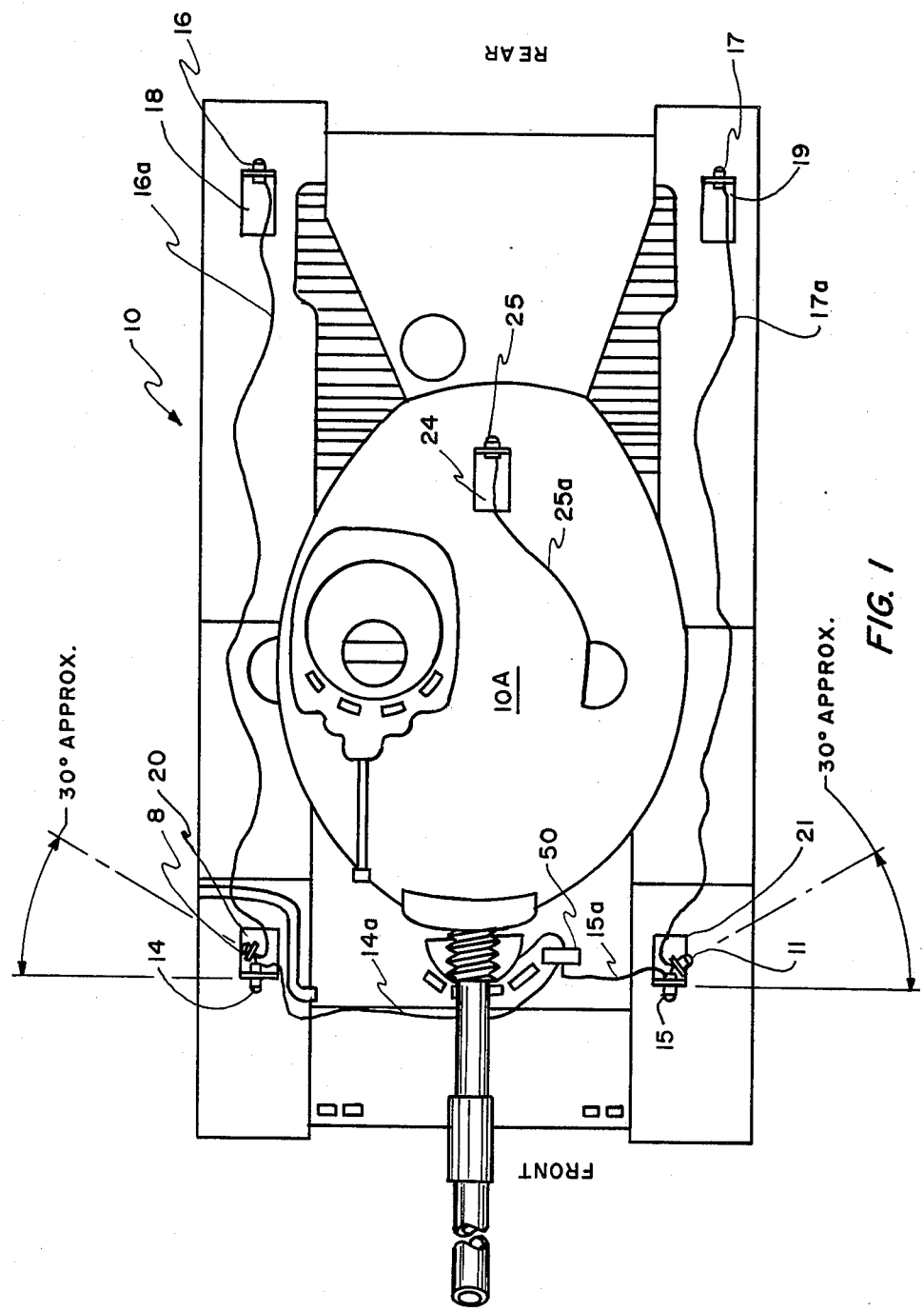
FIG. 1 illustrates an overhead view of the running lights mounted on a simulated enemy vehicle.

FIG. 1 illustrates a typical positioning of the simulated running lights using a U.S. Army M60 tank as a simulated enemy vehicle for mounting the lamps thereon, in a simulation of the Russian T62 tank running lights. It may be assumed throughout this application that the simulated enemy vehicle upon which the simulated running lights are mounted is a U.S. Army tank. However, the invention may be practiced by substituting other appropriate vehicles such as U.S. Army M48 tank or M113 APC, as the simulated enemy vehicle since these vehicles use the same type organic dimmer/map light assemblies. The same electrical wiring scheme and related plugs and jacks for routing the power supply to the lamp assemblies would also be employed. Numeral 10 represents the simulated enemy vehicle. There are five lamp assemblies mounted on vehicle 10 in which the right and left lamp assemblies 20 and 21 in the front have two green lamps 14 and 15 respectively thereon facing directly forward and two amber lamps 8 and 11 respectively thereon facing sideward at about 30° angle from directly sideward toward the rear of vehicle 10. Three other lamp assemblies are comprised of a turret lamp assembly 24, mounted on the top rear of the turret 10A and having a red lamp facing to the rear of the rotatable turret, and right and left lamp assemblies 18 and 19 having two red lamps 16 and 17 respectively thereon facing the rear. Lamp assemblies 20, 21, 18, and 19 are respectively called the right front lamp assembly, the left front lamp assembly, the right rear lamp assembly, and the left rear lamp assembly.

Refer to FIGS. 1, 2, 3, and 7 for an explanation of the power distribution system comprised of the electrical power and wiring system. The power is preferably furnished by the organic power supply from vehicle 10 through a dimmer/map light assembly power jack 37. The turret lamp assembly 24 has an organic turret dimmer/map assembly (not shown) exactly the same as the organic drivers dimmer/map light assembly 46 as shown in FIG. 7. Both of these organic dimmer/map light assemblies are originally used for reading maps and form an integral part of the vehicle used as the simulated enemy vehicle. Power jack 37 is plugged directly into plug 51 when assembly 46 is used only for reading maps. The organic power supply is additionally electrically connected to the simulated running lights along with the map lights behind translucent windows of assembly 46, by separating jack 37 from plug 51 and, by use of a jumper wire yoke comprised of a banana plug 42 and banana jack 44 inserting banana plug 42 into jack 37 and inserting banana jack 44 into plug 51. A dimmer control is in line between the organic input power and the simulated running lights, in which the dimmer control is controlled by turning of knob 48 that controls a potentiometer. Jack 44 should be wrapped with electrical insulating tape to avoid any possible short circuit. The electrical wiring system to the simulated running lights is preferably a two wire system where one wire is grounded by alligator clip 40 connected to a good electrical ground on the inside of the simulated enemy vehicle, preferably near the organic drivers dimmer/map light assembly 46. Wires 55 and 56 connect the power supply and electrical ground respectively to sets of banana plugs and jacks on the junction box 50, shown in FIGS. 1 and 2. Junction box 50 routes a nominal 24 d.c. volts to all of the lamp assemblies, with the exception of the turret lamp assembly 24. A separate junction box (not shown) may route voltage from the organic turret dimmer/map light assembly to the turret lamp assembly 24.

Refer to FIG. 3 for an electrical schematic showing the connection of the turret lamp 25 to the power tap off assembly from the organic turret dimmer/map light assembly (not shown but the same as assembly 46), wherein the power tap off assembly is comprised of banana plug 36 and banana jack 38 and alligator ground clip 34. Plug 36 and jack 38 are connected to the organic turret dimmer/map light assembly in the same manner as banana plug 42 and banana jack 44 were connected to assembly 46. Likewise, ground clip 34 is clipped to a good electrical ground on the inside of the turret. The turret lamp asembly 24 is separated from the other lamp assemblies because of the necessity to allow continuous rotation of the turret 10A without destroying the connecting wires 25a to lamp 25.

It should be noted that many components of the present invention are readily available by federal stock numbers (FSNs) through the Federal Stock System. Some examples of the component and their FSNs are as follows: lamp lens Green, FSN 6210-00-176-4954; lamp lens Red, FSN 6210-00-176-4955; lamp lens Amber, FSN 6210-00-176-4956; lamp housing (for either of the above lamp lens) FSN 6210-00-176-4928; Lamp Bulb #327 FSN 6240-00-155-7836; Red Banana Jack (one of number 54 FIG. 2), FSN 5935-00-258-9896; Black Banana Jack (one of number 52 FIG. 2), FSN 5935-00-258-9895; Red Banana Plug (one of number 54 IG. 2), FSN 5935-00-259-6769; Black Banana Plug (one of number 52 FIG. 2), FSC 5935-NFN; junction box 50 may be of local construction or the following federal stock system item designated as, chassis aluminum, 2 piece 4 inch by 2.25 inch by 2.25 inch, FSN 5999-00-951-4778; the interconnecting electrical wire and the tape used to affix the wire to the simulated enemy vehicle may be of locally available types, or of the following respective federal stock system items designated as, cable, 2 wire Hard service, Type S.J., FSN 6145-00-244-8152 and Tape, pressure sensitive, cloth backed, Green, FSN 8135-00-074-5124.

A dual wire system, i.e. one wire attached to ground and one wire attached to the organic power supply, are used to supply power to all of the lamp assemblies. Dual wires 25a go out the top of the turret 10a and supply power to the turret lamp assembly 24. Right side dual wires 14a and left side dual wires 15a run from junction box 50 to right front and left front lamp assemblies 20 and 21 respectively to furnish power thereto. The dual wires continue as dual wires 16a from the right forward and right standard lights 14 and 8 respectively to the right rearward red light 16. Likewise, wires 17a continue from the left forward and left sideward lights 15 and 11 respectively to the left rearward red light 17. All of these wires and the light assemblies are attached to the top side of vehicle 10 by the most field expedient method, such as the above noted green cloth tape. The green tape allows for easy attachment and removal, but may be attached by other means. Power connections for the lamp assemblies, including the turret lamp assembly, may be easily attached to the two organic dimmer/map light assemblies by removing the banana jack 37 from the plug 51 in these assemblies and by connecting jack 37 from each assembly to the banana plugs 42 and 36 and by plugging jacks 44 and 38 into each plug 51 of assembly 46. Removal of the power connections to all the lamp assemblies is simply the reverse procedure.

FIGS. 4A and 4B illustrate the left front lamp assembly 21 with the appropriate dual wires 15a and 17a attached to lamps 15 and 11 wherein assembly 21 is comprised of a two piece bracket, or sheet metal lamp holder preferably made of metals, such as aluminum or steel. One piece of the sheet metal lamp holder rests on vehicle 10 and has a left forward lamp mounting flange 22 thereon having a hole therein to hold the left forward green lamp 15 and has as a second piece a left sideward lamp mounting sheet metal plate 29, having a hole therein for mounting the sideward light 11, with a flange 26 fastened snugly to the one piece by fastening means 27, such as rivets. It should be noted that the left sideward lamp mounting sheet metal plate 29 is turned approximately 30° toward the rear side.

Figure 5B:
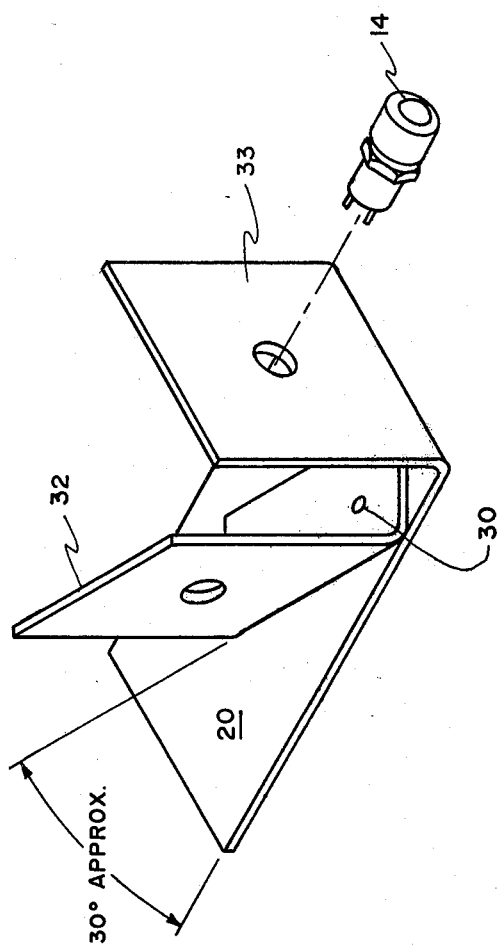
FIG. 5B illustrates a perspective view of the right front lamp assembly looking inward toward the tank.
Figure 5A:
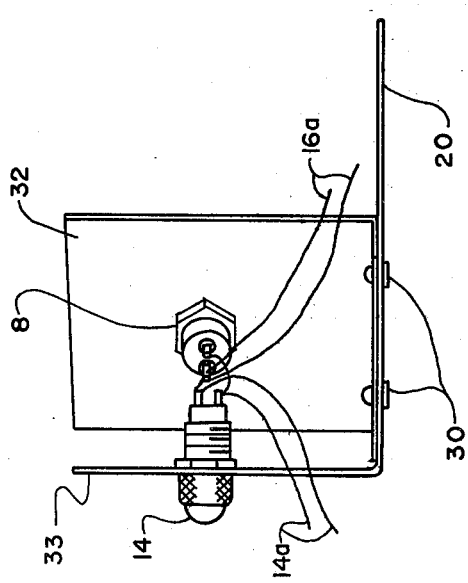
FIG. 5A shows a flat side view of the right front lamp assembly looking outward from the tank.
Figure 6:
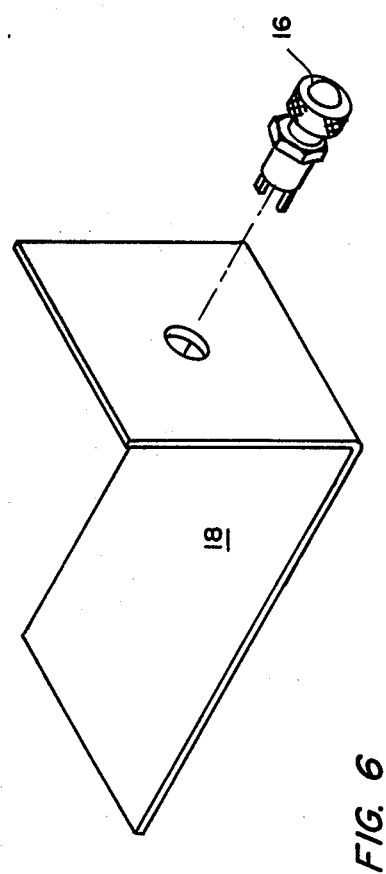
FIG. 6 illustrates one of the rear lamp assemblies.

FIGS. 5A and 5B illustrate the right front lamp assembly 20 with dual wires 14A and 16A attached to lamps 14 and 8. Assembly 20 is also comprised of two piece sheet metal lamp holder the same as assembly 21, and has a right forward lamp mounted flange 33 having a hole therein to hold forward green lamp 14 and a right sideward lamp mounting sheet metal plate 32 having a hole therein for mounting the sideward lamp 8, with a flange fastened to the assembly 20 by fastening means 30. The right sideward lamp mounting sheet metal plate 32 is turned approximately 30° toward the rear side.

We claim:

1. An enemy armor vehicle running lights simulator for training troops to identify enemy vehicles in nighttime operation by providing simulated lighting signature patterns of enemy vehicle running lights, said simulator comprising:

an array of instrument panel simulator lamps which represent enemy armor vehicle simulated running lights mounted at appropriate locations on a simulated enemy vehicle wherein the positions of said instrument panel simulator lamps are comprised of front right and front left lamp assemblies each having forward lamps and sideward lamps thereon and rear right and rear left lamp assemblies and a rear turret lamp assembly each having rearward lamps thereon wherein all forward lamps are green and all sideward lamps are amber and all rearward lamps are red; and a power distribution system comprised of input power to two organic dimmer/map light assemblies each having an organic dimmer control with an input side having said input power applied thereto and with an output side having electrical wiring connected through various jacks and plugs and junction boxes to the map light portion of each of said two organic dimmer/map light assemblies and to designated lamp assemblies for simultaneously connecting said input power to said designated lamp assemblies of said array of instrument panel simulator lamps and to said map light wherein the brightness of said designated lamp assemblies is estimated by the brightness of said map light on the organic dimmer/map light assembly being controlled by said organic dimmer control.

2. A vehicle running lights simulator as set forth in claim 1 wherein said input power of said power distribution system is the organic vehicle power supply of said simulated enemy vehicle.

3. A vehicle running lights simulator as set forth in claim 2 wherein the forward lamps of said front right and front left lamp assemblies face directly forward and the sideward lamps are positioned to face about 30° rearward from the normal to the side and wherein the rearward lamps of said rear right and rear left lamp assemblies face directly rearward and said rear turret lamp assembly faces directly rearward when the turret cannon faces directly forward as in the normal combat position on said simulated enemy vehicle.

4. A vehicle running light simulator as set forth in claim 3 wherein all of said lamp assemblies are comprised of sheet metal lamp holders having holes formed therein in which said lamps are held.

5. A vehicle running light simulator as set forth in claim 4 wherein said sheet metal lamp holders are made from any available metal scraps of about 18 gauge and thicker.

6. A vehicle running light simulator as set forth in claim 5 wherein said sheet metal lamp holders are made of aluminum.

7. A vehicle running light simulator as set forth in claim 5 wherein said sheet metal lamp holders are made of steel.

8. A vehicle running light simulator as set forth in claim 6 wherein said electrical wiring connected through various jacks and plugs and junction boxes to said designated lamp assemblies is comprised of a two wire system wherein one wire is grounded to said simulated enemy vehicle and power is applied to said simulator running lights over a second wire connected to said output side of said organic dimmer control.

9. A vehicle running lights simulator as set forth in claim 8 wherein said one wire is grounded to said simulated enemy vehicle by alligator clips and said second wire is comprised of a jumper wire yoke having a banana plug at one end of the yoke connected to the output side of said organic dimmer control and a banana jack at the other end of the yoke connected to the map light in said organic dimmer/map light assemblies with the wire from said jumper wire yoke connected to said junction boxes by banana plugs and banana jacks wherein said junction boxes route power to said designated lamp assemblies.

10. A vehicle running lights simulator as set forth in claim 9 wherein said input power is a nominal 24 volts d.c. at about 12 amperes.

11. A vehicle running lights simulator as set forth in claim 10 wherein said two organic dimmer/map light assemblies are comprised of an organic turret dimmer/map light assembly used to control the brightness of said turret lamp assembly and an organic driver's dimmer/map light assembly used to control the brightness of the remainder of said designated lamp assemblies of said array of instrument panel simulator lamps.

* * * * *